United States Patent
Wilson et al.

(10) Patent No.: US 9,421,820 B2
(45) Date of Patent: Aug. 23, 2016

(54) STRUCTURALLY SUPPORTED NON-PNEUMATIC WHEEL WITH REINFORCEMENTS AND METHOD OF MANUFACTURE

(75) Inventors: Brian D. Wilson, Greenville, SC (US); Michael Edward Dotson, Greenville, SC (US); Patrick A. Petri, Greer, SC (US); Kirkland W. Vogt, Simpsonville, SC (US)

(73) Assignees: MICHELIN RECHERCHE et TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 411 days.

(21) Appl. No.: 13/977,430

(22) PCT Filed: Jun. 29, 2011

(86) PCT No.: PCT/US2011/042310
§ 371 (c)(1),
(2), (4) Date: Jun. 28, 2013

(87) PCT Pub. No.: WO2012/091754
PCT Pub. Date: Jul. 5, 2012

(65) Prior Publication Data
US 2013/0284329 A1    Oct. 31, 2013

Related U.S. Application Data

(60) Provisional application No. 61/428,074, filed on Dec. 29, 2010.

(51) Int. Cl.
*B60B 9/26* (2006.01)
*B29D 30/02* (2006.01)
(Continued)

(52) U.S. Cl.
CPC ............... *B60B 9/26* (2013.01); *B29D 30/02* (2013.01); *B60B 1/06* (2013.01); *B60C 7/00* (2013.01); *B60C 7/105* (2013.04); *B60C 7/22* (2013.01); *Y10T 29/49538* (2015.01)

(58) Field of Classification Search
CPC ........... B60B 9/26; B60B 1/06; B29D 30/02; B60C 7/00; B60C 7/105
USPC ............ 301/5.301, 5.304, 5.308; 152/17, 48, 152/49, 196, 197, 200; 428/36.5
See application file for complete search history.

(56) References Cited

U.S. PATENT DOCUMENTS

| 1,440,974 A | 2/1923 | Dornburgh |
| 1,495,083 A | 5/1924 | Krusemark |

(Continued)

FOREIGN PATENT DOCUMENTS

| BR | 199902986 A | 3/2000 |
| EP | 0073313 A2 | 3/1983 |

(Continued)

OTHER PUBLICATIONS

Extended European Search Report, MIC-397-EP, dated Jun. 4, 2014, 8 pages.
(Continued)

*Primary Examiner* — John Walters
*Assistant Examiner* — Brian Swenson
(74) *Attorney, Agent, or Firm* — Dority & Manning, PA

(57) ABSTRACT

A non-pneumatic wheel with reinforcement bands that provide structural support for the wheel and a method of manufacture of such a wheel are described. The reinforcement band forms part of an annular reinforcement structure that includes foam spacers positioned between the annular reinforcement band. The foam can be a reticulated foam into which a matrix material such as a polyurethane is introduced. The matrix material can also be used to form one or more features of the non-pneumatic wheel such as spokes, a mounting band, and a hub.

17 Claims, 9 Drawing Sheets

(51) Int. Cl.
*B60C 7/10* (2006.01)
*B60C 7/22* (2006.01)
*B60B 1/06* (2006.01)
*B60C 7/00* (2006.01)

(56) References Cited

U.S. PATENT DOCUMENTS

| | | | |
|---|---|---|---|
| 2,388,421 | A | 11/1945 | Kraft et al. |
| 3,779,835 | A | 12/1973 | Lohr et al. |
| 3,973,613 | A | 8/1976 | Marzocchi |
| 4,024,895 | A | 5/1977 | Barron |
| 4,073,330 | A | 2/1978 | Allard |
| 4,272,309 | A | 6/1981 | Payne |
| 4,734,144 | A | 3/1988 | Markow |
| 4,794,966 | A | 1/1989 | Markow |
| 4,966,212 | A | 10/1990 | Hill |
| 5,221,382 | A | 6/1993 | Sid-Ahmed |
| 5,265,659 | A | 11/1993 | Pajtas et al. |
| 5,565,257 | A | 10/1996 | Tingley |
| 5,837,077 | A | 11/1998 | Kabe et al. |
| 5,906,836 | A | 5/1999 | Panaroni et al. |
| 6,109,319 | A | 8/2000 | Gardetto |
| 6,422,279 | B1 | 7/2002 | Williams et al. |
| 6,460,586 | B1 | 10/2002 | Spragg et al. |
| 6,470,937 | B1 | 10/2002 | Spragg et al. |
| 6,701,987 | B1 | 3/2004 | Abbott |
| 6,769,465 | B2 | 8/2004 | Rhyne et al. |
| 6,792,986 | B2 | 9/2004 | Allen et al. |
| 6,994,134 | B2 | 2/2006 | Grah |
| 7,013,939 | B2 * | 3/2006 | Rhyne .................. B60B 1/0223 152/246 |
| 7,125,083 | B2 | 10/2006 | Piumarta et al. |
| 7,201,194 | B2 * | 4/2007 | Rhyne ...................... B60B 9/04 152/11 |
| 7,363,805 | B2 | 4/2008 | Jayakumar et al. |
| 7,418,988 | B2 | 9/2008 | Cron et al. |
| 7,650,919 | B2 | 1/2010 | Rhyne et al. |
| 8,113,253 | B2 * | 2/2012 | Arakawa .................. B60B 9/10 152/11 |
| 8,215,351 | B2 * | 7/2012 | Thompson ................ B60C 7/18 152/152 |
| 8,517,068 | B2 * | 8/2013 | Delfino .................... B60C 7/18 152/11 |
| 2004/0012246 | A1 | 1/2004 | Rhyne et al. |
| 2007/0267116 | A1 | 11/2007 | Rhyne et al. |
| 2008/0250843 | A1 | 10/2008 | Albohr et al. |
| 2008/0314486 | A1 | 12/2008 | Manesh et al. |
| 2009/0071584 | A1 | 3/2009 | Zhang et al. |
| 2010/0018621 | A1 | 1/2010 | Thompsom |
| 2011/0223366 | A1 | 9/2011 | Petri et al. |

FOREIGN PATENT DOCUMENTS

| | | |
|---|---|---|
| EP | 0400859 A2 | 12/1990 |
| EP | 853009 A2 | 7/1998 |
| EP | 974449 A2 | 1/2000 |
| EP | 1 772 292 | 4/2007 |
| EP | 1980420 A1 | 10/2008 |
| GB | 1257017 | 12/1971 |
| GB | 1285255 | 8/1972 |
| WO | WO 94/11185 A1 | 5/1994 |
| WO | WO 9955541 | 11/1999 |
| WO | WO 02/43974 A1 | 6/2002 |
| WO | WO 03/018332 A1 | 3/2003 |
| WO | WO 2005/007422 A1 | 1/2005 |
| WO | WO 2008/045098 A1 | 4/2008 |
| WO | WO 2008/050503 A1 | 5/2008 |
| WO | WO 2008/102048 A1 | 8/2008 |
| WO | WO 2008/118983 A1 | 10/2008 |
| WO | WO 2009/005946 A1 | 1/2009 |
| WO | WO 2011/112920 | 9/2011 |

OTHER PUBLICATIONS

PCT International Search Report for PCT/US2011/030467, dated Jun. 13, 2011.
PCT International Search Report for PCT/US2011/050905, dated Jul. 14, 2008.
PCT International Search Report for PCT/US2011/042310, dated Nov. 3, 2011.
PCT International Search Report for PCT/US2009/060746, dated Jan. 12, 2010.
PCT International Search Report for PCT/US2011/042533, dated Dec. 6, 2011.

* cited by examiner

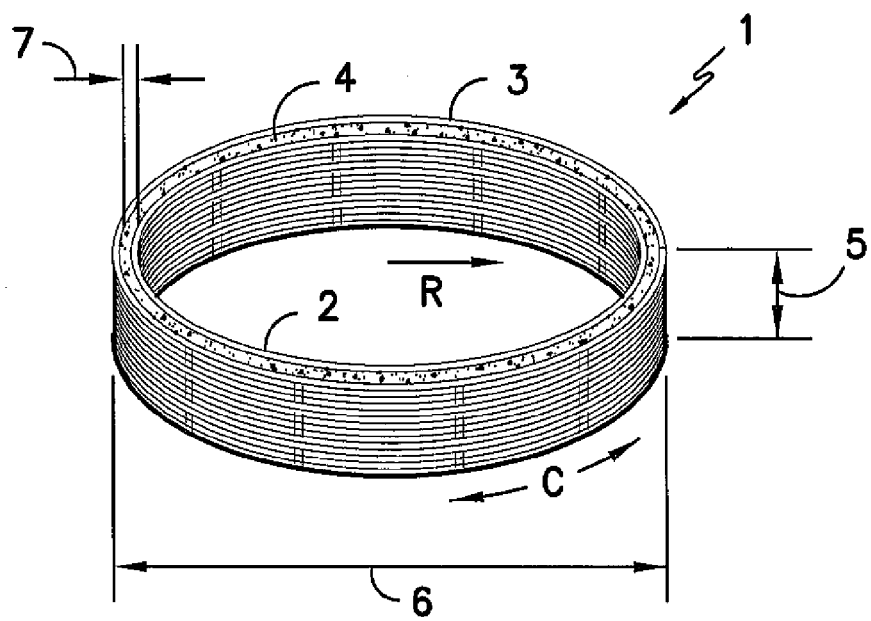
FIG. -1-
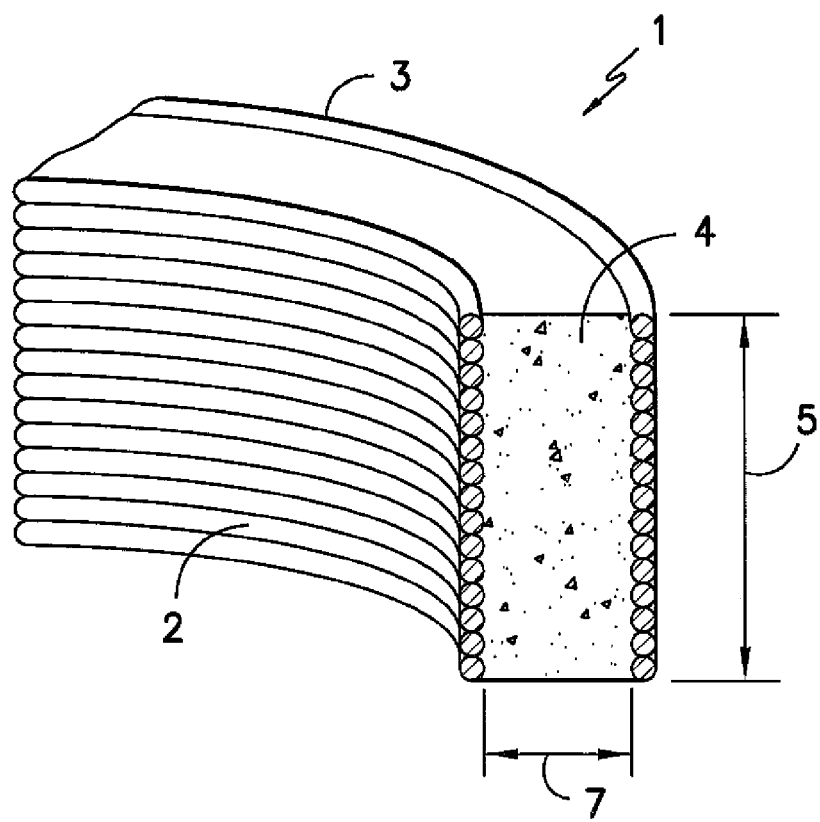
FIG. -2-

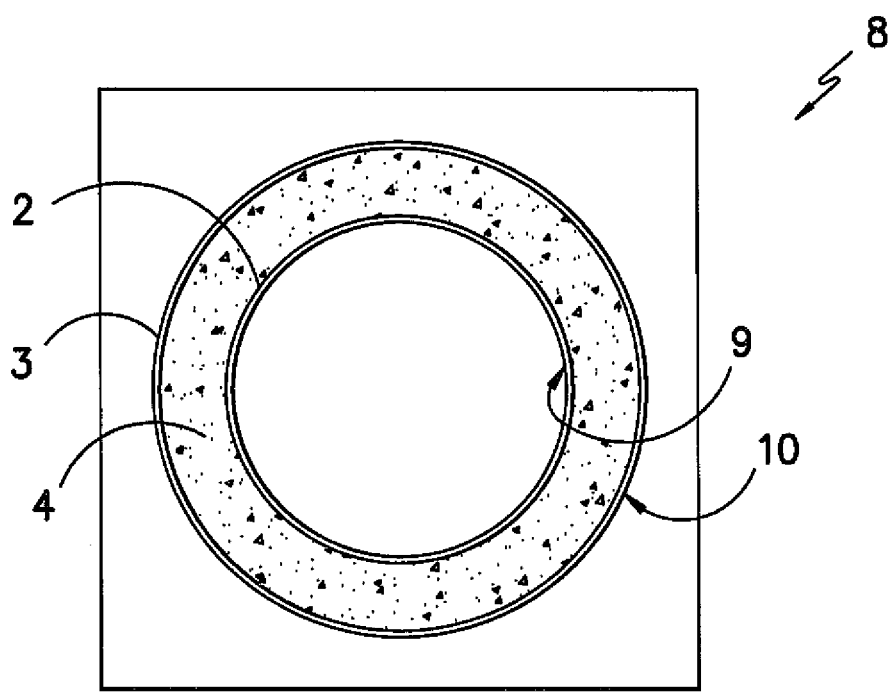
FIG. -3-
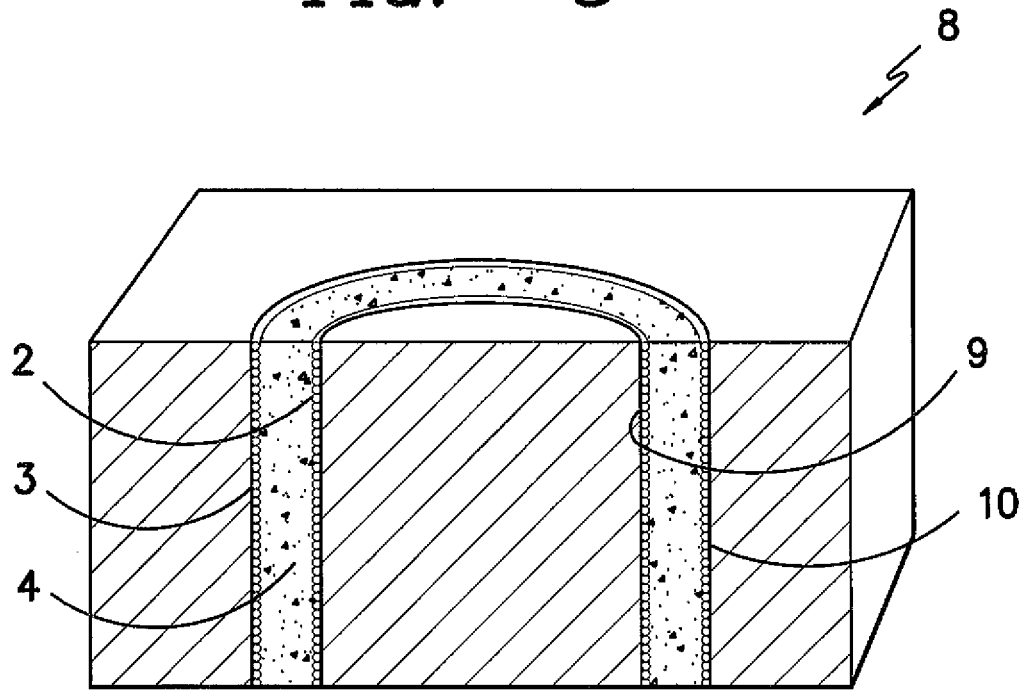
FIG. -4-

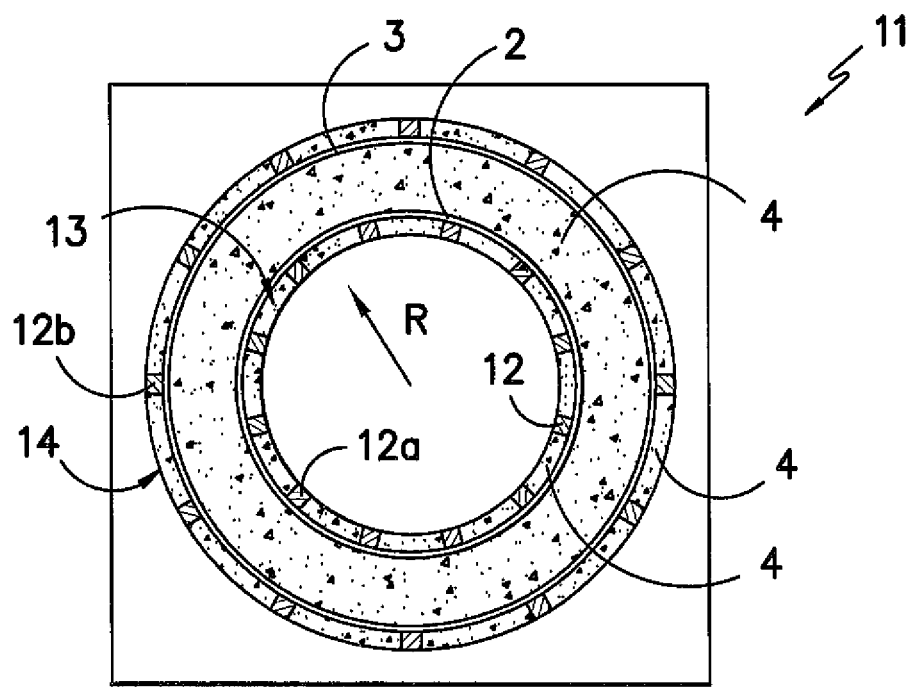
FIG. -5-
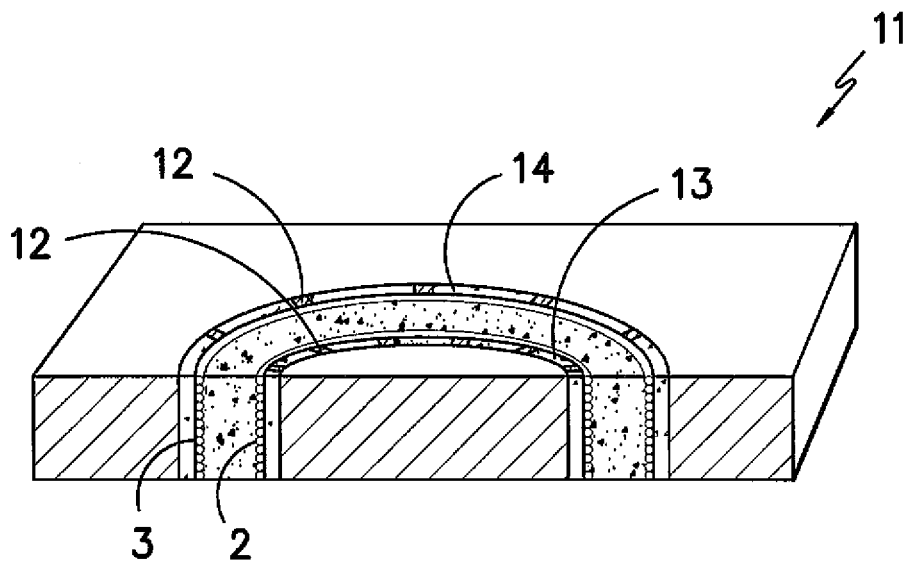
FIG. -6-

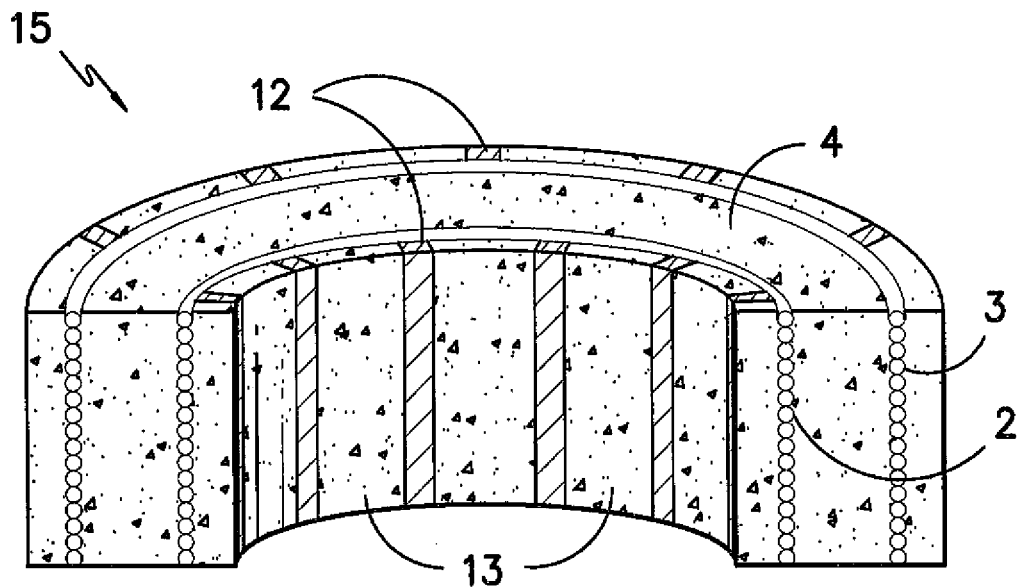
FIG. -7-
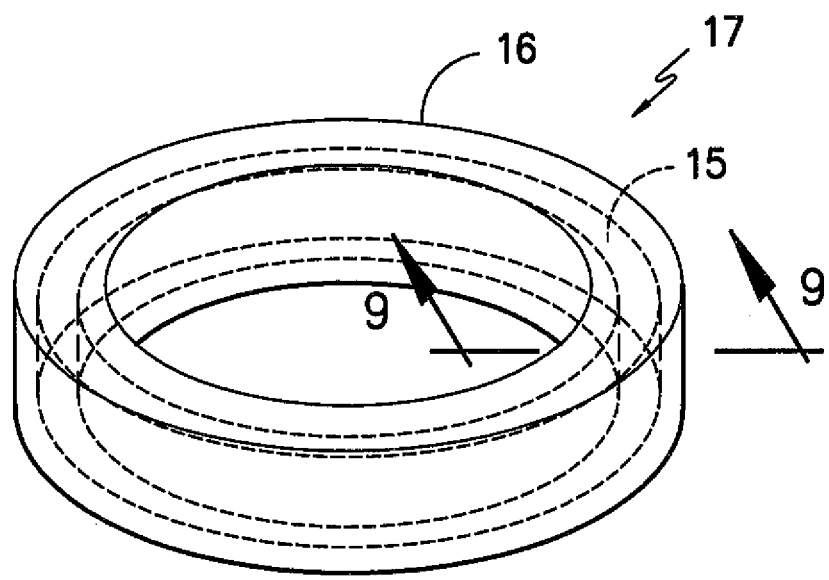
FIG. -8-

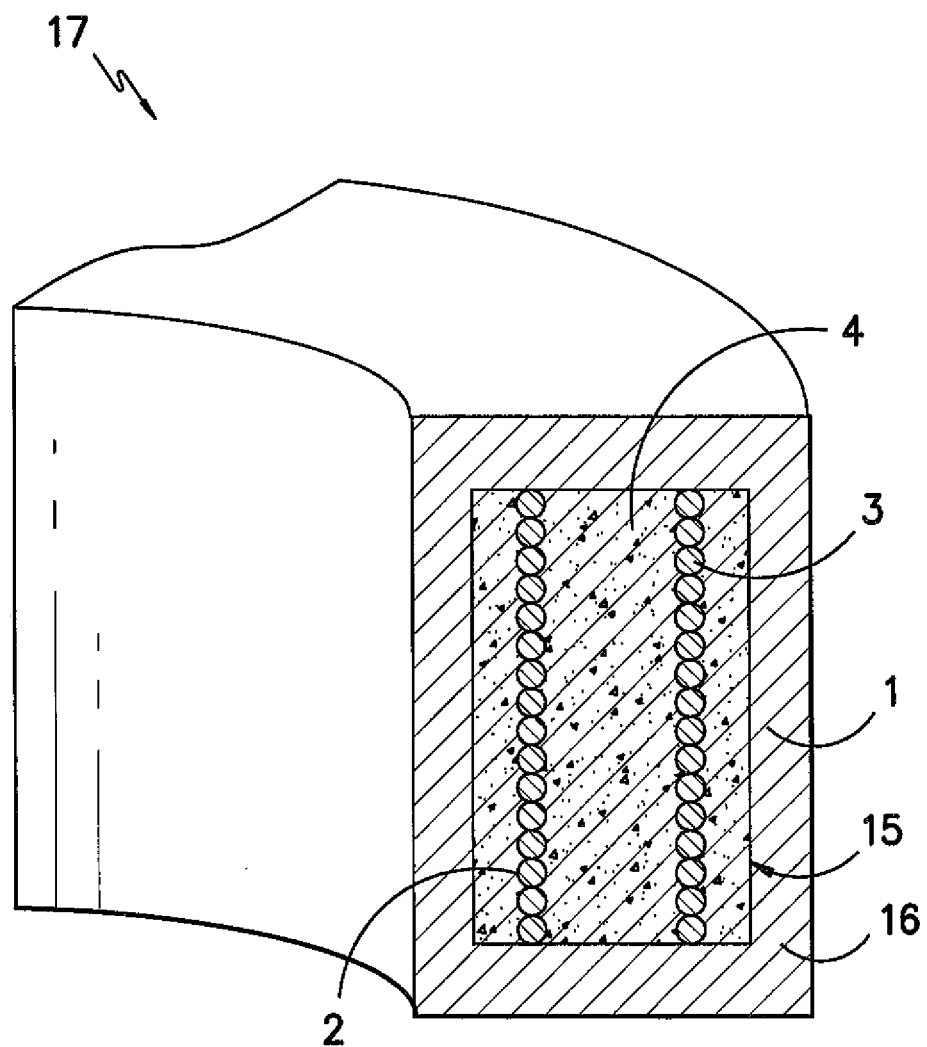
FIG. -9-

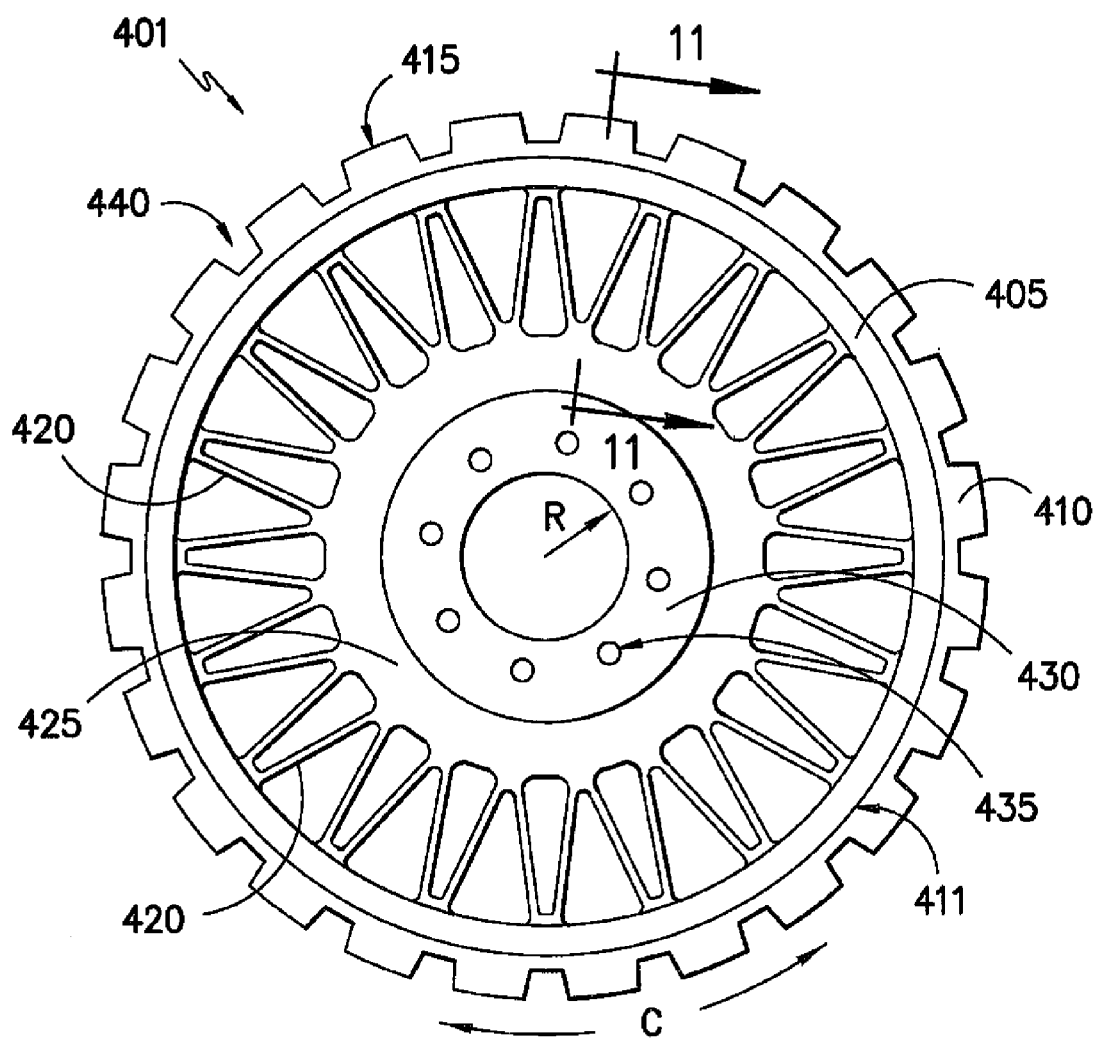
FIG. -10-

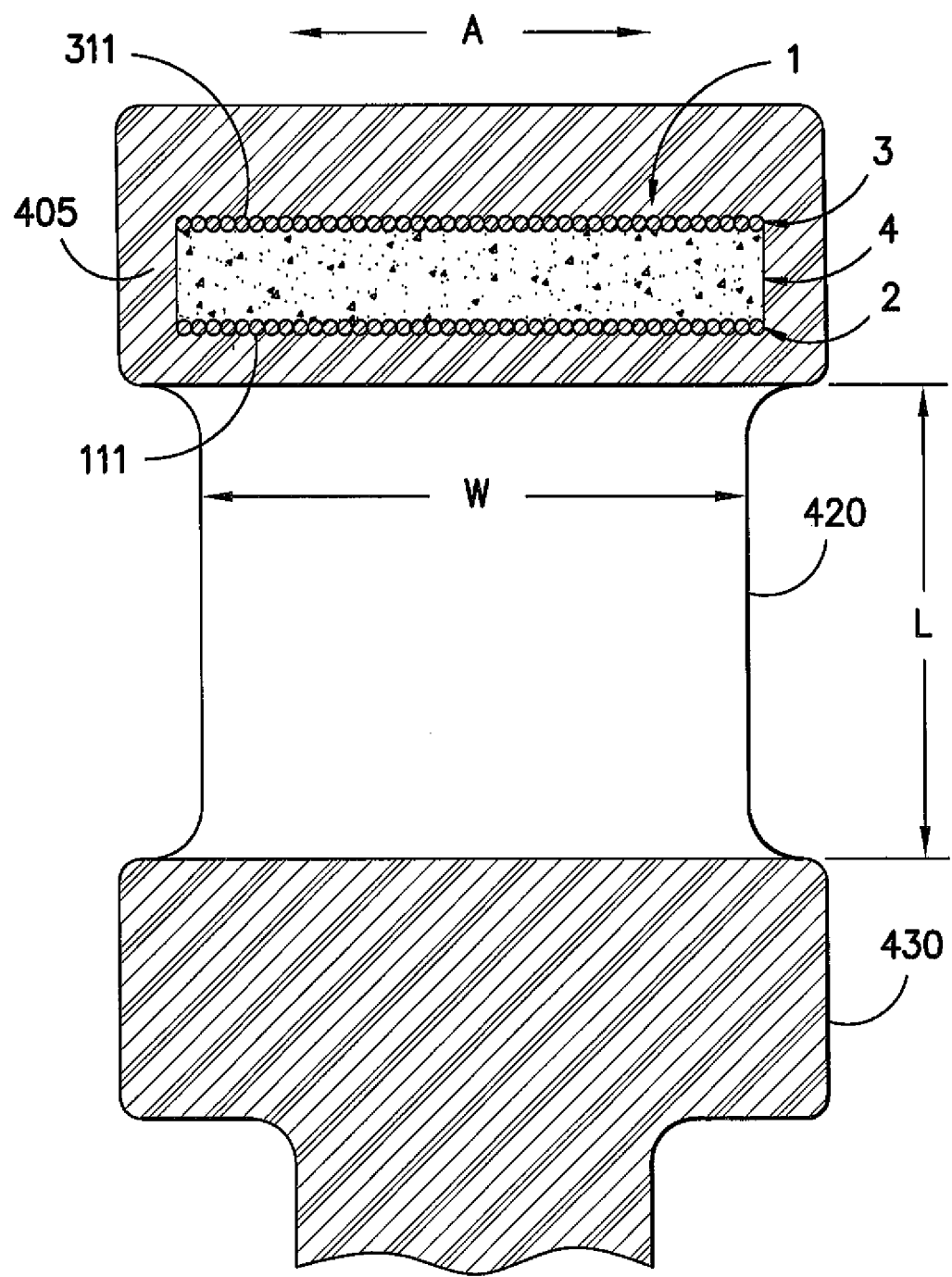
FIG. -11-

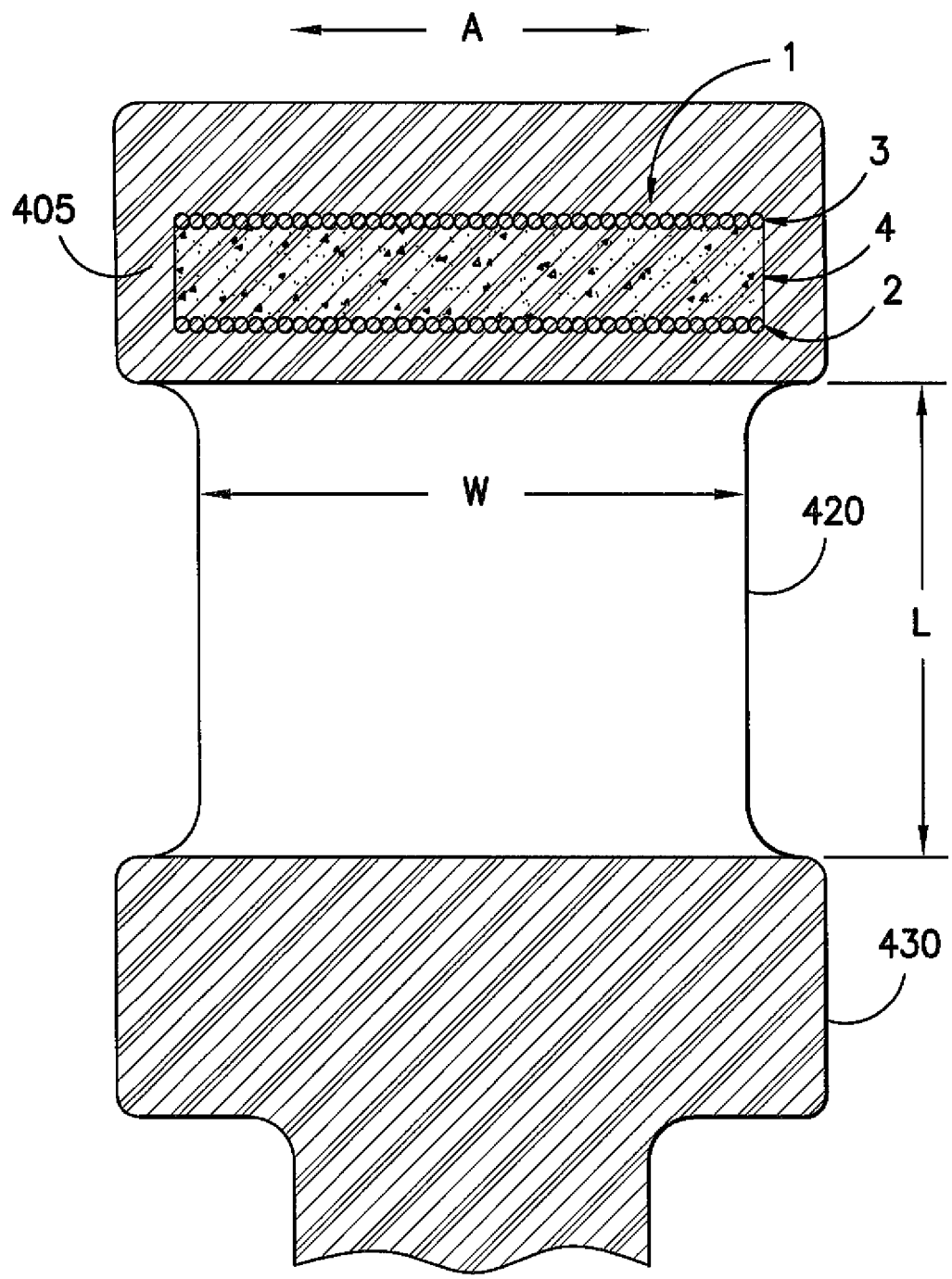
FIG. -12-

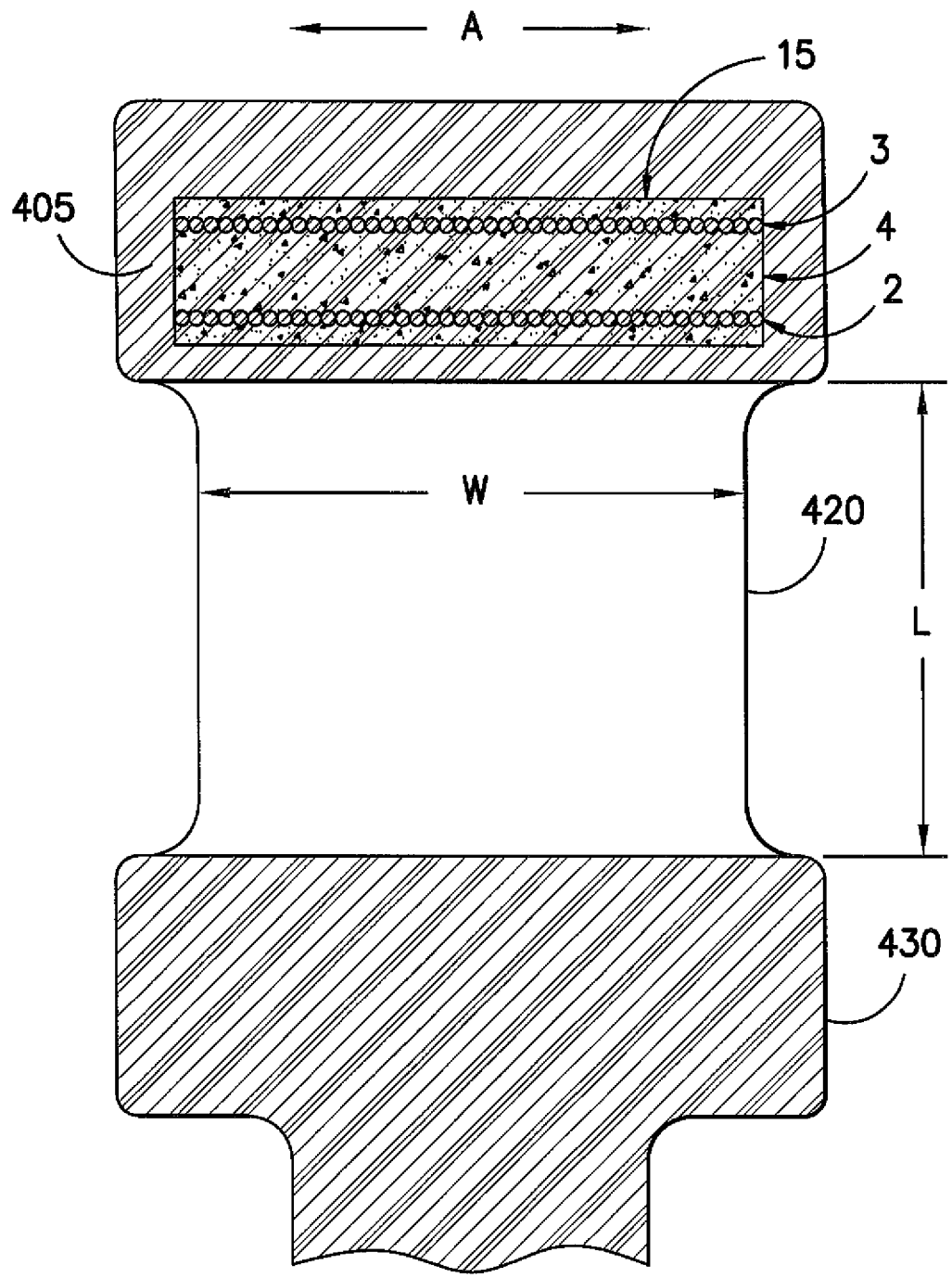
FIG. -13-

STRUCTURALLY SUPPORTED NON-PNEUMATIC WHEEL WITH REINFORCEMENTS AND METHOD OF MANUFACTURE

FIELD OF THE INVENTION

The present invention relates to a non-pneumatic wheel with reinforcement bands that provide structural support for the wheel and to a method of manufacture of such a wheel.

BACKGROUND OF THE INVENTION

The pneumatic tire is a known solution for compliance, comfort, mass, and rolling resistance; however, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Conventional solid tires, spring tires, and cushion tires, although lacking the need for maintenance and the susceptibility to damage of pneumatic tires, unfortunately lack its performance advantages. In particular, solid and cushion tires typically include a solid rim surrounded by a resilient material layer. These tires rely on compression of the ground-contacting portion of the resilient layer directly under the load for load support. These types of tires can be heavy and stiff and lack the shock absorbing capability of pneumatic tires.

Spring tires typically have a rigid wood, metal, or plastic ring with springs or spring like elements connecting it to a hub. While the hub is thereby suspended by the springs, the inflexible ring has only a small contact area with the road, which offers essentially no compliance, and provides poor traction and steering control.

Accordingly, a non-pneumatic wheel and a process for manufacturing a non-pneumatic wheel having performance characteristics similar to a pneumatic wheel would be useful. More particularly, a wheel and a method for manufacturing a non-pneumatic wheel that does not require an air inflation pressure in order to provide performance characteristics of a pneumatic tire would be beneficial. Such a wheel, and a method of making such wheel, having a hub or capable of being connected to a hub for mounting on a vehicle or other transport device would also be very useful.

SUMMARY OF THE INVENTION

Aspects and advantages of the invention will be set forth in part in the following description, or may be obvious from the description, or may be learned through practice of the invention.

In one exemplary aspect of the present invention, a method for manufacturing a non-pneumatic wheel is provided. This method includes the steps of providing a first mold; positioning inner and outer reinforcement bands in a substantially concentric relationship inside the first mold; inserting material to form a polymer foam spacer into the mold and into a substantially annular space located between the inner and outer reinforcement bands so as to provide a casting that includes the spacer and the inner and outer reinforcement bands; providing a second mold having at least one cavity for the molding of one or more features of the non-pneumatic wheel; placing the casting from said step of inserting into the second mold; and, introducing a matrix material into the second mold so as form one or more features of the non-pneumatic wheel.

In another exemplary embodiment, a non-pneumatic wheel is provided. The wheel defines radial and circumferential directions. The wheel includes an annular band for supporting a ground contacting tread portion, the annular band extending about the circumferential direction. An annular reinforcement structure is positioned within the annular band. The reinforcement structure includes an inner reinforcement band extending along the circumferential direction; an outer circumferential band extending along the circumferential direction and positioned radially-outside of the inner reinforcement band; and a foam spacer positioned at least partially between the inner and outer reinforcement bands. A mounting band is positioned radially-inward of the annular band. A plurality of web spokes are connected between the annular band and the mounting band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a top perspective view of an exemplary embodiment of an annular reinforcement structure, which may be provided as a casting from a first mold to be placed in a second mold.

FIG. 2 is a cut-away, perspective view of the exemplary annular reinforcement structure shown in FIG. 1.

FIG. 3 is a top view of the annular reinforcement structure of FIG. 1 in an exemplary mold.

FIG. 4 is a cut-away perspective view of the annular reinforcement structure of FIG. 1 in the exemplary mold of FIG. 3.

FIG. 5 is a top view of another exemplary embodiment of an annular reinforcement structure in an exemplary mold having spacing elements or spacers between the reinforcement bands and the side walls of the mold.

FIG. 6 is a cut-away perspective view of the annular reinforcement structure of FIG. 5 in the mold of FIG. 5 having spacing elements or spacers between the reinforcement bands and the side walls of the mold.

FIG. 7 is a cut-away perspective view of the exemplary annular reinforcement structure of FIGS. 5 and 6 removed from the mold. Such exemplary annular reinforcement structure may be provided as a casting from a first mold for placement in a second mold.

FIG. 8 is a top perspective view of an exemplary annular reinforcement structure (shown by dashed lines) embedded in a matrix material.

FIG. 9 is a cut-away perspective view of an exemplary annular reinforcement structure of FIG. 7 embedded in a matrix material.

FIG. 10 is a perspective view of an exemplary embodiment of a non-pneumatic wheel of the present invention.

FIG. 11 is a partial, cross-sectional view of the exemplary embodiment of FIG. 10, taken along line 11-11, and incorporating an exemplary annular reinforcement structure such as that shown in FIG. 1.

FIG. 12 is a partial, cross-sectional view of the exemplary embodiment of FIG. 10, taken along line 11-11, and incorporating an exemplary annular reinforcement structure such as that shown in FIG. 7.

FIG. 13 is a partial, cross-sectional view of the exemplary embodiment of FIG. 10, taken along line 11-11, and incorporating an exemplary annular reinforcement structure such as that shown in FIG. 7. Unlike FIG. 12, in FIG. 13 the matrix material has permeated the spacer.

The use of identical or similar reference numerals in different figures denotes identical or similar features.

DETAILED DESCRIPTION OF THE INVENTION

The present invention provides a non-pneumatic wheel with reinforcement bands that provide structural support for the wheel and to a method of manufacture of such a wheel. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

FIGS. 1 and 2 illustrate an exemplary embodiment of annular reinforcement structure 1 as may be used in a non-pneumatic wheel of the present invention. Annular reinforcement structure 1 has an inner reinforcement band 2, outer reinforcement band 3, and a cast-in-place polymer foam spacer 4. The reinforcement structure may be constructed in a variety of dimensions. By way of example, the width 5 of the annular reinforcement structure 1 may range from 0.5 inches to 5.5 feet, and the outside diameter 6 may range from 3 inches to 13 feet. By way of further example, the distance between the inner reinforcement band 2 and the outer reinforcement band 3, that is, the thickness 7 of spacer 4, may range from 2 mm to 25 mm.

Each of the reinforcement bands 2 and 3 is a circular strip, characterized as being flexible in the radial direction R and relatively inextensible along the circumferential direction C. In one embodiment of the invention, the reinforcement bands 2 and 3 are sufficiently flexible to be subjected to a bend radius that is one-tenth or less of the radius of a given band, when such band is oriented in the shape of a circle, without experiencing a permanent set in the band. The inner and outer reinforcement bands 2 and 3 may be the same or different, both in terms of materials of construction and design.

By way of example, either reinforcement band 2 or 3 may be a woven or non-woven textile structure, an arrangement of monofilament and/or multifilament cords, bi-component yarns, spun yarns, braided cords, single or multilayer sheets of polymers or metals, or a combination of the foregoing materials. By way of additional example, the reinforcement band 2 or 3 may be constructed of fiberglass, rayon, nylon, aramid, polyester, carbon or metal, such as steel. The materials may be treated to improve performance, to allow for easier manufacturing, and/or to improve bond strength between materials. Examples include brass-plated steel, elastomer coated cords, and the use of adhesion promoters, such as resorcinol-formaldehyde latex. Further examples of suitable reinforcement bands that can be used in the present invention may be found in belts for power transmission, hoses, tires, rollers, strapping and gaskets. By way of further example, materials having a Young's modulus ($lb/in^2$), of 5,000,000 or greater, or even 10,000,000 or greater, are useful for the construction of reinforcement bands 2 or 3. Alternatively, the stiffness of the reinforcement bands 2 and 3 and the matrix material filling the interstices in the polymer foam spacer located between the bands may be characterized by a relative Young's modulus of 1,000:1 or even 10,000:1, respectively.

In one example, reinforcement band 2 or 3 may be a monofilament or multifilament cord wound into a helix and making at least three revolutions. The multiple windings of the cord may be held together by a yarn intertwined between adjacent cords, for example by weaving or knitting, with the yarn arranged perpendicular to the cords. The intertwined yarn may include fibers that can be melted to fuse the structure together, thereby providing stability to the bands 2 and 3, especially in the axial direction. Also within the scope of the invention is the use of multi-ply reinforcement bands. For example, layers of reinforcement material may overlay one another, perhaps joined by a suitable binder, adhesive or stitch bond. The plies may be oriented parallel to each other or at an angle, for example, by winding one ply around the other in a spiral. The multi-ply structures are considered as a single reinforcement band herein. Another example of reinforcement bands as may be used in the present invention are described as continuous loop reinforcement assemblies in U.S. patent application Ser. No. 12/661,196, filed Mar. 12, 2010, which is incorporated herein by reference.

According to an exemplary aspect of the present invention, polymer foam spacer 4 is cast-in-place. More particularly, inner and outer bands 2 and 3 are maintained in a spaced-apart, concentric orientation, and the polymer foam spacer 4 is formed in situ. For example, referring to FIGS. 3 and 4, a ring mold 8 as may be used to manufacture annular reinforcement structure 1 is shown. Ring mold 8 has mold walls 9 and 10, which correspond to the circumference of inner reinforcement band 2 and outer reinforcement band 3, respectively. Mold 8 may be made from any suitable material and provided with finishes or coatings to promote release of the annular reinforcement structure 1 from the mold.

Continuing with FIGS. 3 and 4, polymer foam spacer 4 may be formed in situ by introducing a liquid, reactant mixture capable of polymerizing, into the space between the inner and outer reinforcement bands 3 and 4. By way of example, the reactants may be a polyol and a polyisocyanate, which react to form a polyurethane foam, or the reactant mixture may contain a prepolymer or oligimer, which is cured in place. Alternatively, a polymer may be introduced into the space between the inner and outer reinforcement bands 3 and 4 in a liquid state. For example, the polymer may be dissolved or dispersed in a suitable solvent, or the polymer may be a melted thermoplastic resin. In addition to polyurethane foam, including polyester-polyurethanes and polyether-polyurethanes, examples of polymer foams include polystyrene, polyolefin, in particular polyethylene and polypropylene, polyvinyl chloride, latex rubber, viscoelastic and melamine resin foams.

The cell structure of the polymer foam spacer 4 can be controlled by suitable blowing agents, chemical and/or physical. Other additives, such as initiators, catalysts, crosslinking agents, and plasticizers, can be added to promote the reaction and modify the chemical and mechanical properties of the foam. The foam may be an open-cell or closed-cell foam. Generally, open-cell foam is believed to provide a greater range of applications, particularly when the annular reinforcement structure 1 is embedded in a matrix material and the matrix material fills voids in the polymer foam spacer, as discussed in more detail herein. By way of example, the polymer foams may have a fraction of voids to net volume of foam of 75% or greater, 85% or greater or even 95% or greater. The void fraction may be increased by reticulating the polymer foam spacer, for example, by combustion or chemical degradation. It may be advantageous to remove any "skin" formed on the outer surface of the polymer foam spacer, prior to reticulating the foam. Reticulated polyurethane foam having a fraction of voids to net volume of 90% or greater has been found to be particularly useful.

Polymer foam spacers having a wide range of physical properties, such as resilience, cell structure, and porosity can be employed, depending upon the intended application of the non-pneumatic wheel into which annular reinforcement structure 1 will be incorporated. For most applications, it is desirable that the polymer foam spacer has sufficient resilience to be handled without damage, yet be capable of maintaining the relative spacing and alignment of the inner and outer reinforcement bands during subsequent manufacturing steps. In one embodiment of the invention, the polymer foam spacer is elastomeric, that is, the spacer can elastically recover from 30% compression or greater. Polymer foam spacers that can elastically recover from 50% compression, or even from 80% compression or greater, may be advantageous in certain applications. In various embodiments of the invention, relative movement of the inner reinforcement band 2 and outer reinforcement band 3 within annular reinforcement structure 1 is desirable and may be created by flexing or shear force. In such circumstances, spacer 4 may be provided with a minimum thickness 7 of e.g., 5 mm.

In one embodiment of the invention, one or both of the reinforcement bands 2 and 3 are porous, that is, permeable to fluids, in particular, permeable to a liquid, reactant mixture capable of polymerizing, a solution or dispersion of a polymer, or a melted, thermoplastic polymer. Accordingly, the polymer foam forming the spacer 4 may permeate pores or openings in the reinforcement bands 2 and 3, when the polymer foam of spacer 4 is formed in situ. For example, as will be further described below, reinforcement bands 2 and 3 as well as spacer 4 may be permeable to what is referred to herein as a matrix material such as e.g., a polyurethane that is introduced into mold 8 as a liquid and then hardens to form the composite, annular reinforcement structure 1 as may be used in non-pneumatic wheel.

One challenge that can be presented during the molding of an annular reinforcement structure using mold 8 as described above is the positioning of reinforcement bands 2 and 3 as desired in mold 8. Accordingly, referring now to FIGS. 5 and 6, in one exemplary aspect of the present invention, a mold 11 is provided with multiple spacing elements 12a and 12b between the inner side wall 13 and the outer side wall 14 of mold 11. More particularly, spacing elements 12a are located between inner side wall 13 and reinforcement band 2 while spacing elements 12b are located between outer reinforcement band 3 and outside side wall 14 of mold 11. As such, the polymer foam 4 can be cast in-situ between the inner and outer reinforcement bands 2 and 3, as well as between the inner reinforcement band 2 and side wall 13 of mold 11 and between the outer reinforcement band 3 and side wall 14 of mold 11. The resulting annular reinforcement structure 15 is shown in FIG. 7 removed from mold 11. Reinforcement bands 2 and 3 are embedded in the polymer foam spacer 4.

Accordingly, spacers of spacing elements 12a and 12b maintain the orientation of the reinforcement bands 2 and 3 relative to mold 11. In addition, for this exemplary aspect of the present invention, a narrow space is created between the mold 11 and the reinforcement bands 2 and 3 due to the width along radial direction R of spacing elements 12a and 12b. By way of example, the space created by the spacing elements 12a and 12b between the reinforcement bands 2 and 3 and the side walls 13 and 14 of mold 11 may range from 0.5 mm to 10 cm. However, in other exemplary embodiments of the invention, spacing elements 12a and 12b may have a construction that does not create such space.

A variety of constructions may be used for spacing elements 12a and 12b such as vertical ribs, steps, or jigs. Elements 12a and 12b may also be constructed from multiple pins projecting from the walls 13 and 14 of mold 11 to hold bands 2 and 3. Alternatively, pins could project from elements 12a and 12b into holes in the walls 13 and 14 so as to engage mold 11. Elements 12a and 12b may be constructed as permanent or removable inserts that are held in place by friction and either removed after the polymer foam is cast or left in the annular reinforcement structure 1 or 15 for incorporation into a non-pneumatic wheel. By way of further example, reinforcement bands 2 and 3 may be held in alignment by magnets or electromagnets, when ferrous components are employed for bands 2 and 3.

Referring now to FIGS. 8 and 9, annular reinforcement structure 15 is shown embedded in a matrix material 16, to create reinforced ring 17. Depending on the selection of the matrix material 16, whether the polymer foam spacer 4 is an open-cell or closed-cell foam, and the processing conditions, matrix material 16 may or may not permeate polymer foam spacer 4. In the embodiment of the invention shown in FIG. 9, the matrix material has permeated polymer foam spacer 4 and the voids in the foam are filled with matrix material 16.

Matrix material 16 may be selected from a wide range of organic and inorganic materials, especially those that may be cast with the annular reinforcement structure 15 embedded therein. By way of example, matrix material 16 may be a natural or synthetic polymer, including thermoplastic and thermosetting materials. Of particular interest are elastomeric matrix materials, such as natural or synthetic rubber, polyurethane, segmented copolyester, polyamide co-polymer and thermoplastic elastomers. In one embodiment of the invention, the polymer foam spacer 4 is a reticulated, polyurethane foam and the matrix material 16 is a solid polyurethane material, which permeates the voids in the polyurethane foam. In another example, matrix material 16 is a ceramic, concrete, or organometallic compound.

Also within the scope of the present invention are processes in which the polymer spacer foam 4 is a relatively low melting temperature thermoplastic and is partially or completely melted during the process of embedding the annular reinforcement structure 15 in matrix material 16. For example, thermoplastic polymer foam spacer 4 could be melted by the introduction of a matrix material 16, either because the matrix material 16 is heated or involves an exothermic reaction. Alternatively, polymer foam spacer 4 could be melted or dissolved, prior to introduction of the matrix material 16, after spacer 4 has served its function of maintaining the relative orientation of the inner and outer reinforcement bands 2 and 3.

Reinforced ring 17 is illustrated using annular reinforcement structure 15 by way of example only. Other constructions such as e.g., annular reinforcement structure 1 may be used as well. In addition, for certain applications, particularly larger diameter annular reinforcement structures such a e.g., non-pneumatic wheels or tires, it may be advantageous to manufacture such structure having three or more concentric reinforcement bands, with a cast-in-place polymer foam spacer between each pair of adjacent reinforcement bands. For example, three reinforcement bands can be maintained in spaced-apart, concentric relation by a cast-in-place polymer foam spacer between the inner and middle reinforcement band and between the middle and outer reinforcement band. Such an annular reinforcement structure can be embedded in a matrix material, as described herein with regard to annular reinforcement structures having two reinforcement bands and a single cast-in-place foam spacer.

As previously stated, embodiments of the annular reinforcement such as annular reinforcements 1 and 15 may be used to create a non-pneumatic wheel or tire. FIG. 10 provides a perspective view of an exemplary embodiment of a structurally supported wheel 401 in accordance with the present invention. As used herein, structurally supported means that the tire carries a load by its structural components without the support of a gas inflation pressure. FIG. 11 provides a partial, cross-sectional view of wheel 401 taken along line 11-11 as shown in FIG. 10. Arrows C denote the circumferential direction. Arrow R denotes the radial direction. Arrows A denotes axial direction, also referred to sometimes as the transverse or lateral direction.

Referring now more particularly to FIG. 11, annular reinforcement structure 1 is positioned within a band 405 extending about circumferential direction C. For this exemplary embodiment, annular reinforcement structure 1 is constructed as previously described. In addition, other constructions such as annular reinforcement structure 15 or constructions having multiple spacers may be used as previously indicated. For wheel 401, bands 2 and 3 provide e.g., vertical stiffness for wheel 401 while polymer foam spacer 4 assists in providing for a shear layer for wheel 401 as will be further described.

In accordance with the invention, wheel 401 is useful in applications where the traction, steering, or suspension qualities of a pneumatic tire are advantageous or in need of improvement. A structurally supported wheel 401 constructed in accordance with the present invention as more fully described below can offer improved compliance and stiffness characteristics, in a wheel requiring less maintenance than a pneumatic tire. In addition to use on motor vehicles, such a wheel could also be advantageously used, for example, on a wheel chair, a gurney, a hospital bed, a cart for sensitive equipment, or other vehicles or conveyances where sensitivity to shock is important. In addition, the wheel may be used in place of casters for chairs or other furniture, or as wheels for baby carriages, skate boards, in-line skates, etc. Wheel 401 of the invention could be used in machines or apparatuses where load bearing or load applying wheels are used. The term "vehicle" is used below for the purposes of the description; however, any device on which compliant wheels could be mounted is included in the following description and "vehicle" should be understood to include the same.

Wheel 401 as shown in FIGS. 10 and 11 has an annular band 405 and a plurality of tension transmitting elements, illustrated as web spokes 420, extending transversely across and inward from band 405, to a mounting band 425 at the radially inner end of the web spokes 420. Mounting band 425 anchors wheel 401 to a hub 430 with holes 435 for mounting. A tread portion 410 is formed at the outer periphery of band 405. Tread portion 410 may be an additional layer bonded on the band 405 as shown in FIG. 10, for example, so as to provide different traction and wear properties than the material used to construct band 405. Alternatively, tread portion 410 may be formed as part of the outer surface of the compliant band 405. Tread features may be formed in the tread portion 410 and may include blocks 415 and grooves 440.

As mentioned, web spokes 420 in the exemplary embodiment of FIGS. 10 and 11 extend transversely across wheel 401, which as used herein means that the web spokes 420 extend from side to side of wheel 401 and may be aligned with the axis of rotation, or may be oblique to the wheel axis. Further, "extending inward" means that web spokes 420 extend between band 405 and mounting band 425, and may lie in a plane radial to the wheel axis or may be oblique to the radial plane. In addition, as shown in FIG. 10, web spokes 420 may actually include spokes at different angles to the radial plane. Various shapes and patterns may be used as shown, e.g., in U.S. Pat. No. 7,013,939.

Band 405 supports the load on wheel 401 and resiliently deforms to conform to the road (or other supporting surface) to provide traction and handling capabilities. More particularly, as described in U.S. Pat. No. 7,013,939, when a load is placed on the wheel 401 through hub 430, band 405 acts compliantly in that it bends and otherwise deforms for ground contact and forms a contact patch, which is the portion of wheel 401 that is in contact with the ground under such load. The portion of band 405 that is not in ground contact acts in a manner similar to an arch and provides a circumferential compression stiffness and a longitudinal bending stiffness in the equatorial plane sufficiently high to act as a load-supporting member. As used herein, "equatorial plane" means a plane that passes perpendicular to the wheel axis of rotation and bisects the wheel structure.

The load on the wheel 401, transmitted from the vehicle (not shown) to hub 430 essentially hangs by web spokes 420 attached to the load supporting portion of band 405. Web spokes 420 in the ground contacting region do not experience tensile loading due to the load. As wheel 401 rotates, of course, the specific portion of the compliant band 405 acting as an arch continually changes, however, the concept of an arch is useful for understanding the load supporting mechanism. The amount of bending of band 405, and accordingly, the size of the contact patch is proportional to the load. The ability of band 405 to bend resiliently under the load provides a compliant ground contact area that acts similar to that of a pneumatic tire, with similar advantageous results.

For example, band 405 can envelop obstacles to provide a smoother ride. Also, band 405 is able to transmit forces to the ground or road for traction, cornering, and steering. By contrast, in typical solid and cushion tires, the load is supported by compression of the tire structure in the contact area, which includes compression of the cushion material under the rigid hub. Compliance of the cushion material is limited by the compression properties of the material and the thickness of the material on the rigid wheel or hub. Examples of non-pneumatic wheels using compliant bands can also be found in U.S. Pat. No. 6,769,465 B2 and U.S. Pat. No. 7,650,919 B2.

Still referring to FIGS. 10 and 11, web spokes 420 are substantially sheet-like elements having a length L in the radial direction, a width W in the axial direction corresponding generally to the axial width of the compliant band 405, although other widths W may be used including widths W that vary along the radial direction as shown in FIG. 11. Web spokes 420 also have a thickness (i.e. a dimension perpendicular to length L and width W) that is generally much less than either the length L or the width W, which allows a web spoke to buckle or bend when under compression. Thinner web spokes will bend when passing through the contact area with substantially no compressive resistance, that is, supplying no or only insignificant compressive force to load bearing. As the thickness of web spokes 420 is increased, the web spokes may provide some compressive load bearing force in the ground contact area. The predominant load transmitting action of web spokes 420 as a whole, however, is in tension. The particular web spoke thickness may be selected to meet the specific requirements of the vehicle or application.

As seen in FIG. 11, preferably, web spokes 420 are oriented relative to the compliant band 405 across the axial direction A. Tension in web spokes 420 is, therefore, distributed across band 405 to support the load. By way of example, web spokes 420 may be formed of an elastomeric material having a tensile modulus of about 10 to 100 MPa. Web spokes 420 may be reinforced if desired. The material used to construct web spoke material 420 should also exhibit elastic behavior to return to original length after being strained to e.g., 30%, and to exhibit constant stress when the web spoke material is strained to e.g., 4%. Further, it is desirable to have a material with a tan 6 of not more than 0.1 at the relevant operating conditions. For example, commercially available rubber or polyurethane materials can be identified which meet these requirements. By way of further example, Vibrathane B836 brand urethane from Cherntura Corporation of Middlebury, Conn. has been suitable for construction of web spoke 420.

For the exemplary embodiment of FIGS. 10 and 11, web spokes 420 are interconnected by radially inner mounting band 425, which encircles the hub 430 to mount wheel 401 to the hub 430. Depending on the construction materials and manufacturing process, hub 430, mounting band 425, annular band 405, and web spokes 420 may be molded as single unit. Alternatively, one or more of such components may be formed separately and then attached to each other through e.g., adhesives or molding. Additionally, other components may be included as well. For example, an interface band can be used to connect web spokes 420 at their radially outer ends, and then the interface band would be connected to band 405.

According to a further embodiment, web spokes 420 could be mechanically attached to hub 430, for example, by providing an enlarged portion on the inner end of each web spoke 420 that engages a slot device in hub 430, or by attaching adjacent web spokes 420 to form a loop at a hook or bar formed in hub 430.

Substantially purely tensile load support is obtained by having a web spoke 420 that has high effective stiffness in tension but very low stiffness in compression. To facilitate bending in a particular direction, web spokes 420 may be curved. Alternatively, web spokes 420 can be molded with a curvature and straightened by thermal shrinkage during cooling to provide a predisposition to bending in a particular direction.

Web spokes 420 should resist torsion between annular band 405 and hub 430, for example, when torque is applied to wheel 401. In addition, web spokes 420 should resist lateral deflection when, for example, turning or cornering. As will be understood, web spokes 420 that lie in the radial-axial plane, that is, are aligned with both the radial and axial directions, will have high resistance to axially directed forces, but, particularly if elongated in the radial direction R, may have relatively low resistance to torque in the circumferential direction C. For certain vehicles and applications, for example, those producing relatively low torque, a web spoke package having relatively short spokes 420 aligned with the radial direction R will be suitable. For applications where high torque is expected, one of the arrangements such as shown in FIGS. 5 through 8 of U.S. Pat. No. 7,013,939 may be more suitable. In the variations shown therein, orientations of web spokes are provided that include a force-resisting component in both the radial and the circumferential directions, thus adding resistance to torque, while retaining radial and lateral force-resisting components. The angle of orientation may be selected depending on the number of web spokes used and the spacing between adjacent web spokes. Other alternative arrangements may also be used.

One advantage of the compliant wheel of the invention is that the selection of the size and arrangement of band 405 and web spokes 420 allows the vertical, lateral, and torsional stiffness of the wheel to be tuned independently of the contact pressure and of each other. The operating parameters of band 405, load carrying and compliance, are determined in part by selection of materials having the circumferential compression stiffness and longitudinal bending stiffness in the equatorial plane to meet the design load requirements. These parameters are examined in view of the diameter of wheel 401, the width of annular band 405 in the axial direction A, the thickness of band 405 in radial direction R, and the length and spacing of web spokes 420. The number of web spokes is selected to maintain circularity of band 405, and will depend also on the spacing between adjacent web spokes 420.

Continuing with FIG. 11, as previously indicated, band 405 includes an annular reinforcement structure 1. As will be described, band 405 may be e.g., molded integrally as part of non-pneumatic wheel 401 or constructed separately and then attached with the other elements of wheel 401. For example, in one exemplary method of manufacturing wheel 401, annular reinforcement structure such as structure 1 or structure 15 are constructed a previously described using a first mold such as Mold 8 or mold 11. In either case, the cavity used e.g., in mold 8 or mold 11 is sized to match the desired dimensions for the compliant, annular band 405. More particularly, the relative position of outer mold walls 10 or 14 are determined by the inside surface 411 (FIG. 10) of tread portion 410, while the relative position of inner wall 9 or 13 is determined by the dimensions of web spokes 420. Alternatively, these dimensions may be relieved slightly so as to facilitate loading the resulting molded reinforcement structure into a mold for wheel 401 as will be further described.

After casting foam spacer 4 as previously described, the annular reinforcement structure is demolded. It should be noted that in an embodiment that uses annular reinforcement structure 15, spacing elements 12a and 12b are retained within the foam. After demolding, the foam material is reticulated by combustion or other known processes to create the porous structure previously described.

Next, the resulting casting of the annular reinforcement structure as shown e.g., in FIG. 1 or FIG. 7, is placed into a second mold—i.e. a wheel mold that provides for one or more cavities for the casting of wheel 401 (or other wheel having the desired shape and features as previously described for various embodiments of a structurally supported, non-pneumatic wheel). For example, annular reinforcement 15 can be placed into a wheel mold that provides one or more cavities defining spokes 420, mounting band 425, and hub 430. Alternatively, hub 430 may be formed separately and configured for receipt of the molded mounting band 425. Either way, the external surfaces of the casting of the annular reinforcement band as shown e.g., in FIG. 1 or FIG. 7 provide locating surfaces to help properly position the casting in the wheel mold. A matrix material is then provided into the mold to form the features (e.g., spokes, band, etc.) of a non-pneumatic wheel such as e.g., wheel 401. The matrix material may also impregnate spacer 4 and potentially annular reinforcement bands 2 and 3 as previously discussed. FIG. 11 illustrates the use of annular reinforcement band 1 where matrix material forming band 405 has not permeated into spacer 4 whereas FIG. 12 illustrates an annular reinforcement band 1 where the matrix material has permeated spacer 4. FIG. 13 illustrates the used of annular reinforcement band 15 where matrix material has permeated spacer 4. By way of example, a matrix material suitable for such construction includes e.g., Vibrathane B836 brand urethane from Chemtura Corporation of Middlebury, Conn.

The resulting casting of wheel 401 from a second mold or wheel mold is then provided with a tread band or tread portion 410 to complete the process of manufacturing a structurally supported, non-pneumatic wheel. In an exemplary alternative method of the present invention, the casting of the annular reinforcement structure could be positioned in tread portion 410 using an interference fit before placing both into a wheel mold of the desired configuration. Such a method could help eliminate interference issues between the spokes 420 and/or band 425 during loading and closing of the wheel mold.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for manufacturing a non-pneumatic wheel, comprising:
    positioning inner and outer reinforcement bands in a substantially concentric relationship inside a first mold having an inner side wall and an outer side wall;
    connecting a plurality of spacing elements with the inner and outer reinforcement bands
    inserting material to form a polymer foam spacer into the mold and into a substantially annular space located between the inner and outer reinforcement bands so as to provide a casting that includes the polymer foam spacer, the spacing elements, and the inner and outer reinforcement bands;
    maintaining the relative positions of the inner and outer reinforcement bands in the first mold during said step of inserting material to form the polymer foam spacer;
    providing a second mold having at least one cavity for the molding of one or more features of the non-pneumatic wheel;
    placing the casting from said step of inserting into the second mold; and, introducing a matrix material into the second mold so as form one or more features of the non-pneumatic wheel.

2. A method for manufacturing a non-pneumatic wheel as in claim 1, further comprising the step of reticulating the polymer foam spacer.

3. A method for manufacturing a non-pneumatic wheel as in claim 2, wherein said step of reticulating the polymer foam spacer creates a fraction of voids to net volume of about 75 percent or greater.

4. A method for manufacturing a non-pneumatic wheel as in claim 1, further comprising the step of placing a tread band around an intermediate from said step of introducing a matrix material.

5. A method for manufacturing a non-pneumatic wheel as in claim 1, further comprising the step of placing a tread band around the casting from said inserting step before said step of placing the casting.

6. A method for manufacturing a non-pneumatic wheel as in claim 1, wherein the matrix material of said step of introducing is created by an in situ reaction in voids of the polymer foam spacer.

7. A method for manufacturing a non-pneumatic wheel as in claim 1, wherein the matrix material comprises a polyurethane elastomer that hardens after said step of introducing.

8. A method for manufacturing a non-pneumatic wheel as in claim 1, further comprising the step of permeating the inner and outer reinforcement bands with the polymer foam spacer.

9. A method for manufacturing a non-pneumatic wheel as in claim 1, wherein said step of introducing a matrix material further comprises the step of permeating voids in the polymer foam spacer with the matrix material.

10. A method for manufacturing a non-pneumatic wheel as in claim 1, wherein the first mold has an outer side wall positioned outside of the outer reinforcement band and the first mold has an inner side wall positioned inside of the inner reinforcement band and further comprising the step of maintaining the inner and outer reinforcement bands in spaced relationship from the inner side wall and outer side wall, respectively.

11. A non-pneumatic wheel, the wheel defining radial and circumferential directions, the wheel comprising:
    an annular band for supporting a ground contacting tread portion, said annular band extending about the circumferential direction;
    an annular reinforcement structure positioned within said annular band, said reinforcement structure comprising:
        an inner reinforcement band extending along the circumferential direction;
        an outer reinforcement band extending along the circumferential direction and positioned radially-outside of said inner reinforcement band;
        a plurality of spacing elements connected with at least one of said inner reinforcement band and said outer reinforcement band, and configured for maintaining the relative position of said inner reinforcement band, said outer reinforcement band, or both, within said annular reinforcement structure;
        a foam spacer positioned at least partially between said inner and outer reinforcement bands;
    a mounting band positioned radially-inward of said annular band; and
    a plurality of web spokes connected between said annular band and said mounting band.

12. A non-pneumatic wheel as in claim 11, wherein said foam spacer comprises a reticulated foam.

13. A non-pneumatic wheel as in claim 12, wherein said reticulated foam has a fraction of voids to net volume of about 75 percent or greater.

14. A non-pneumatic wheel as in claim 11, wherein said annular band, said reinforcement structure, said mounting band, and said web spokes are comprised of a polyurethane.

15. A non-pneumatic wheel as in claim 11, further comprising a tread band supported by said annular band.

16. A non-pneumatic wheel as in claim 11, wherein said foam spacer comprises a foam that is cast in place with said inner and said outer reinforcements.

17. A non-pneumatic wheel as in claim 11, wherein said foam spacer permeates pores located in said inner reinforcement band, said outer reinforcement band, or both.

* * * * *